United States Patent
Wilson

(10) Patent No.: US 12,161,087 B2
(45) Date of Patent: Dec. 10, 2024

(54) WALL-MOUNTED SCRATCHING STRUCTURE ASSEMBLY FOR CATS

(71) Applicant: Catastrophic Creations, LLC, Byron Center, MI (US)

(72) Inventor: Michael Wilson, Byron Center, MI (US)

(73) Assignee: Catastrophic Creations LLC, Grand Rapids, MI (US)

( * ) Notice: Subject to any disclaimer, the term of this patent is extended or adjusted under 35 U.S.C. 154(b) by 184 days.

(21) Appl. No.: 17/855,491

(22) Filed: Jun. 30, 2022

(65) Prior Publication Data
US 2024/0000041 A1 Jan. 4, 2024

(51) Int. Cl.
*A01K 15/02* (2006.01)
*F16M 13/02* (2006.01)

(52) U.S. Cl.
CPC ........... *A01K 15/024* (2013.01); *F16M 13/02* (2013.01)

(58) Field of Classification Search
CPC ....... A01K 15/024; A01K 29/00; F16M 13/02
USPC ......................................... 119/706, 28.5, 485
See application file for complete search history.

(56) References Cited

U.S. PATENT DOCUMENTS

| | | | |
|---|---|---|---|
| 7,669,556 B2 | 3/2010 | Reusche | |
| 7,934,470 B1 * | 5/2011 | Barker | A01K 1/035 119/28.5 |
| 8,826,862 B2 | 9/2014 | Lee | |
| 10,149,454 B2 | 12/2018 | Wilson | |
| 10,420,320 B1 | 9/2019 | Wilson | |
| 10,524,452 B2 | 1/2020 | Feldman | |
| 2006/0233601 A1 * | 10/2006 | Crain | F16M 11/10 403/300 |
| 2008/0190377 A1 * | 8/2008 | Clowder | A01K 15/024 119/706 |
| 2009/0308328 A1 * | 12/2009 | Kellogg | A01K 15/025 119/706 |
| 2010/0000558 A1 * | 1/2010 | Ruffin | A01K 15/024 427/202 |
| 2010/0215355 A1 * | 8/2010 | Olien | F16M 11/10 396/428 |

(Continued)

FOREIGN PATENT DOCUMENTS

TW M397143 2/2011
TW M397143 U 2/2011

OTHER PUBLICATIONS

Amazon, Fukumaru Cat Hammock Wall Mounted Large Cats Shelf—Modern Beds and Perches—Premium Kitty Furniture for Sleeping, Playing, Climbing, and Lounging—Easily Holds up to 40 lbs, Dec. 31, 2022.

(Continued)

*Primary Examiner* — Brady W Frazier
*Assistant Examiner* — Zoe Tam Tran
(74) *Attorney, Agent, or Firm* — Caldwell Intellectual Property Law

(57) ABSTRACT

A wall-mounted scratching structure assembly for cats includes a mounting frame affixed to a vertical surface, the mounting frame including a wall-facing surface mounted against the vertical surface, a post-facing surface facing away from the vertical surface, and an attachment mechanism affixing the mounting frame to the vertical surface. The attachment mechanism may further allow a plurality of assemblies to be connected so as to create a stable, continuous climbing path for a cat.

18 Claims, 18 Drawing Sheets

(56) References Cited

U.S. PATENT DOCUMENTS

| | | | |
|---|---|---|---|
| 2012/0204808 A1* | 8/2012 | Shenefelt | A01K 15/027 |
| | | | 119/706 |
| 2012/0222623 A1 | 9/2012 | Moore | |
| 2015/0014015 A1* | 1/2015 | Partridge | H02G 13/00 |
| | | | 248/74.2 |
| 2015/0107520 A1* | 4/2015 | Durnen | A01K 15/024 |
| | | | 119/28.5 |
| 2017/0172108 A1* | 6/2017 | Long, Jr. | A01K 15/024 |
| 2019/0021284 A1* | 1/2019 | Feldman | A47B 47/047 |
| 2020/0315129 A1* | 10/2020 | Kumetz | A01K 1/035 |
| 2021/0062847 A1* | 3/2021 | McClure | F16B 13/068 |
| 2021/0400914 A1* | 12/2021 | Wilson | A01K 15/024 |

OTHER PUBLICATIONS

Amazon, Coziwow Cat Hammock Wall Mounted Large Cats Shelf Modern Beds and Perches Premium Kitty Furniture for Sleeping, Playing and Lounging Easily Holds up to 22 lbs, White, Dec. 31, 2022.

Walmart, Cat Wall Mounted Climbing Step, Pine Solid Wood DIY Cat Climbing Frame Cat Wall Hanging Cat Scratching Post, Dec. 31, 2022.

Amazon, Beewarm Cat Wall Bed Hammock Mounted—Lifetime Replacement—Easily Holds up to 40 lbs, Black Stripe, Dec. 31, 2022.

* cited by examiner

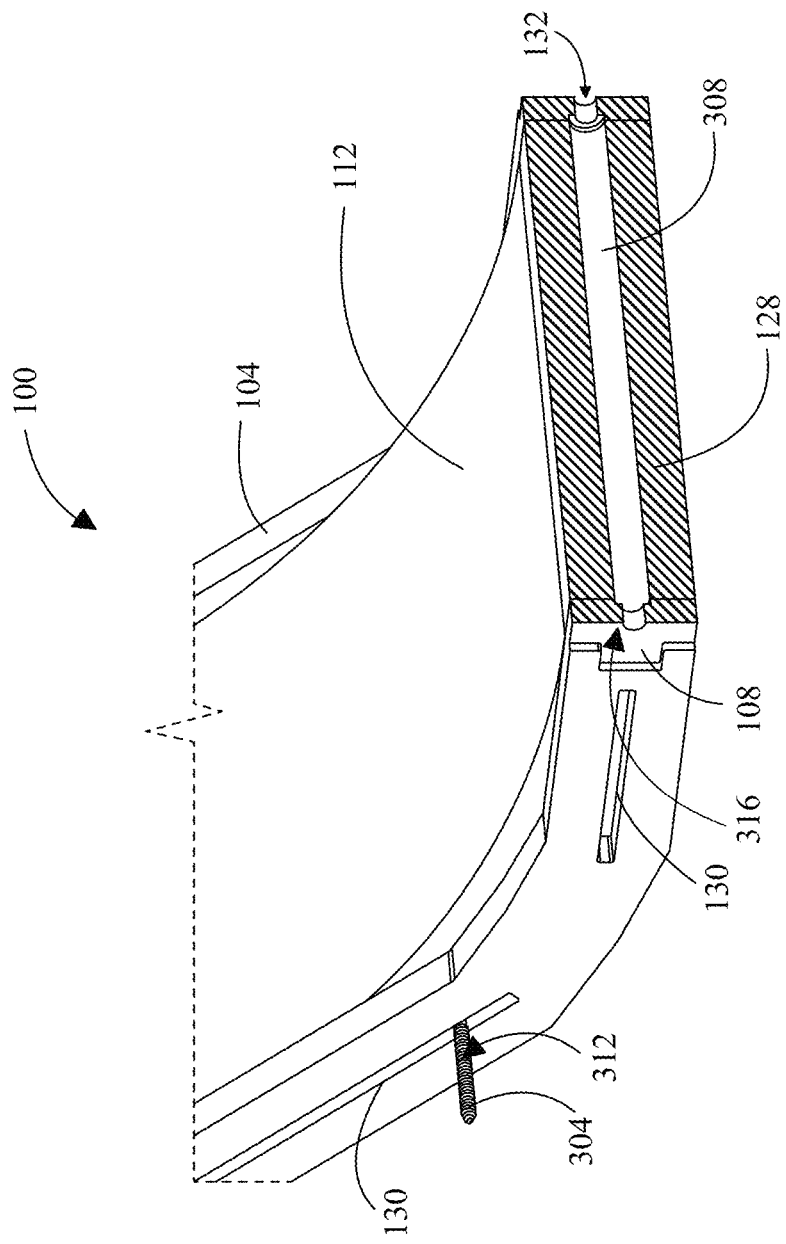

WALL-MOUNTED SCRATCHING STRUCTURE ASSEMBLY FOR CATS

CROSS-REFERENCE TO RELATED APPLICATIONS

Field of the Invention

The present invention generally relates to the field of pet furniture. In particular, the present invention is directed to a wall-mounted scratching structure assembly for cats.

BACKGROUND

As many pet owners can attest, cats have a physical and psychological need both to climb upon objects and to sharpen claws on surfaces. To avoid resulting damage to furniture, householders often provide cats with play structures and scratch posts on which to exercise their instinctive proclivities. Such structures, however, can be difficult to integrate in a home, due to constraints both of space and style.

SUMMARY OF THE DISCLOSURE

In an aspect, a wall-mounted scratching structure assembly for cats is provided. The assembly includes a mounting frame affixed to a vertical surface, the mounting frame including a wall-facing surface mounted against the vertical surface, a structure-facing surface facing away from the vertical surface, a scratching structure, wherein the scratching structure includes a proximal end abutting the mounting frame and facing the vertical surface, and a distal end opposite the proximal end, and an attachment mechanism, wherein the attachment mechanism includes a slot disposed in the mounting frame, a bore disposed in the scratching structure and opposite at least a portion of the slot, and a threaded screw traversing through the bore and the slot and disposed within the wall to affix the assembly to the vertical surface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 3A is a perspective cross-sectional view of the exemplary embodiment of the assembly taken along line 3-3 of FIG. 1B in accordance with one or more embodiments of the present disclosure;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Embodiments described in this disclosure include scratching structures that can be securely and easily mounted to walls. Mounting may be invisible once assembled, leading to an aesthetically pleasing appearance. Use of a separate mounting plate, which may be affixed to studs, provides users with an easy attachment process. Mounting plate and scratching structure combinations described herein may also be readily removed and reattached without wear to any part, maximizing economy and customizability. Scratching structure, or at least a portion thereof, may be removed for replacement and/or repairs, followed by later reattachment. Embodiments described in this disclosure may also be structurally strong, enabling assembly to support weight of even comparatively massive cats, and to sustain repeated use without breaking.

Figure 1A:
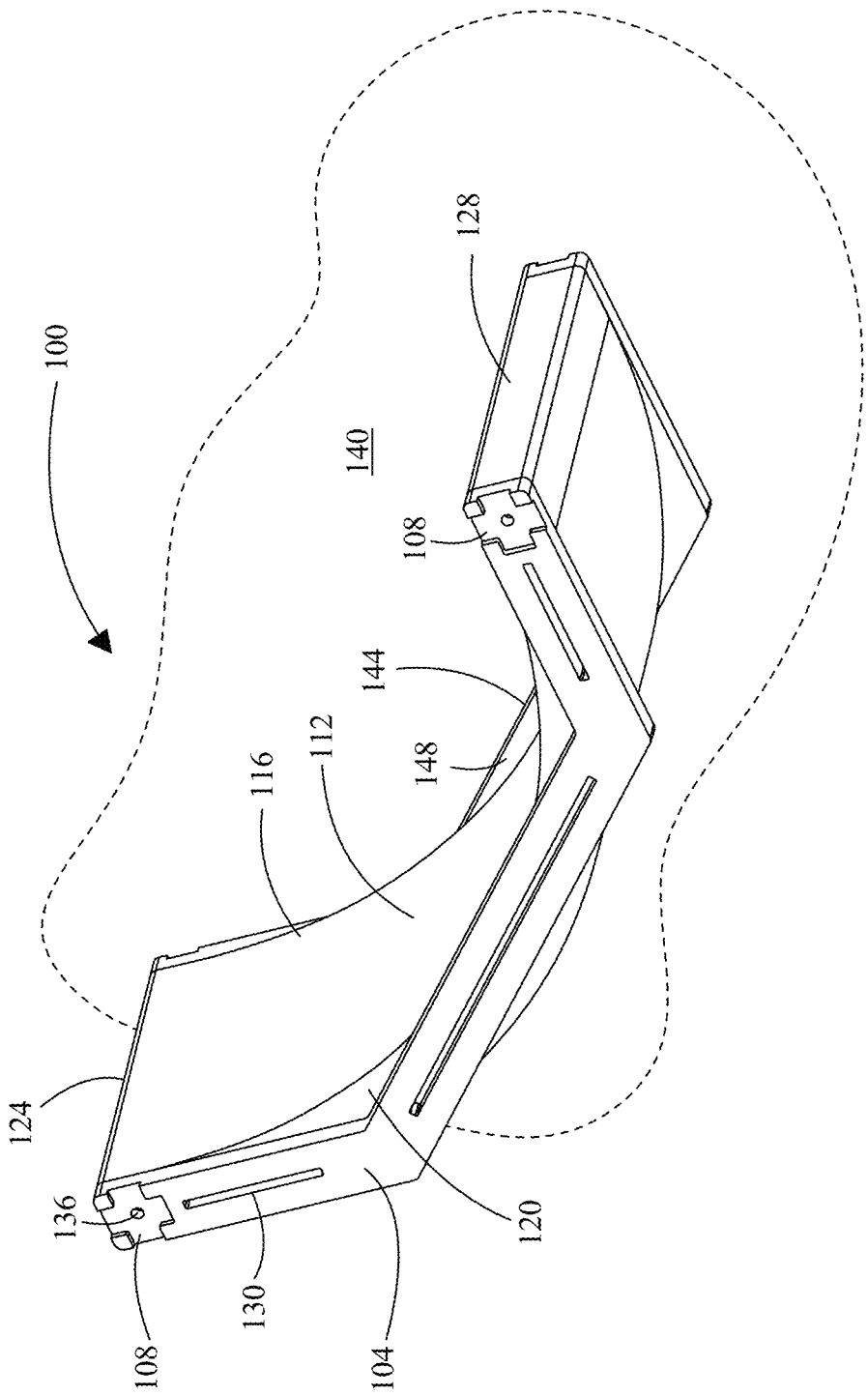
FIGS. 1A-1C are schematic diagrams of an exemplary embodiment of a scratching structure assembly in accordance with one or more embodiments of the present disclosure.
Figure 1B:
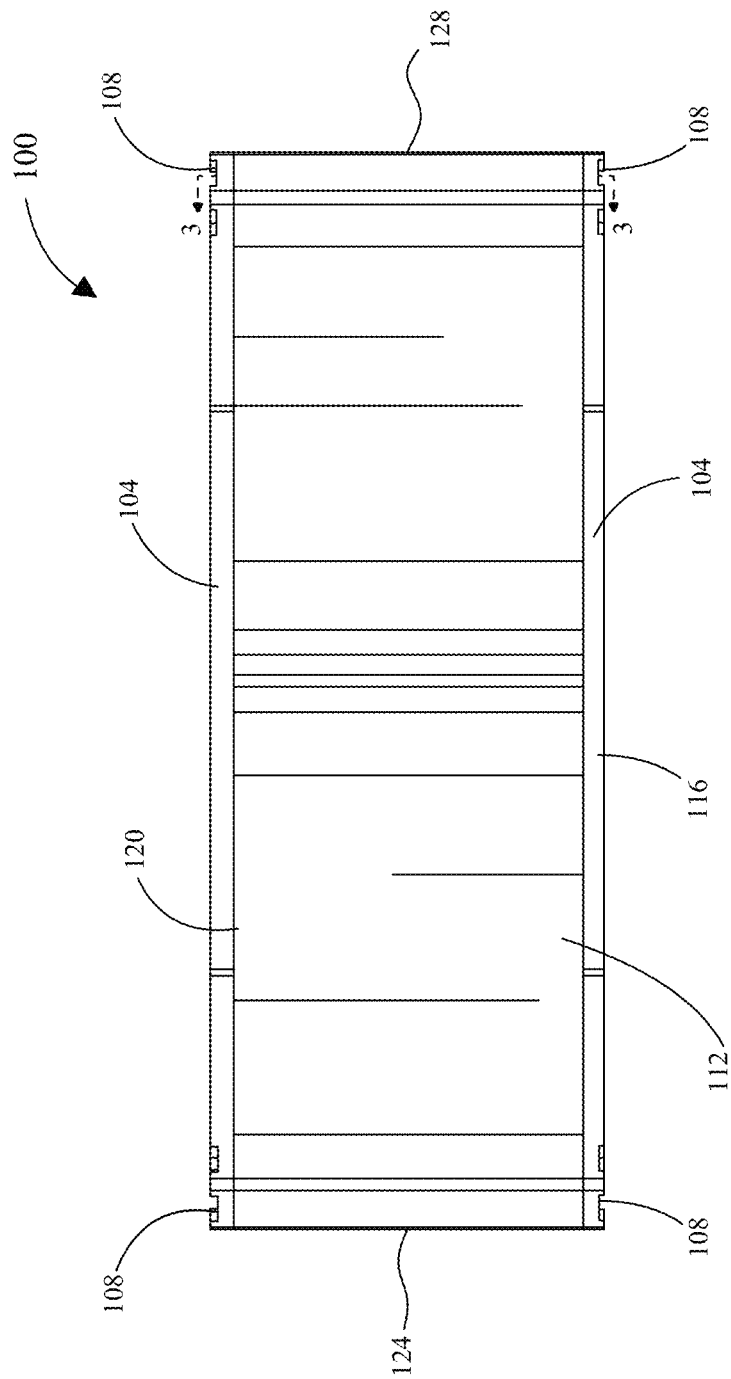
Figure 1C:
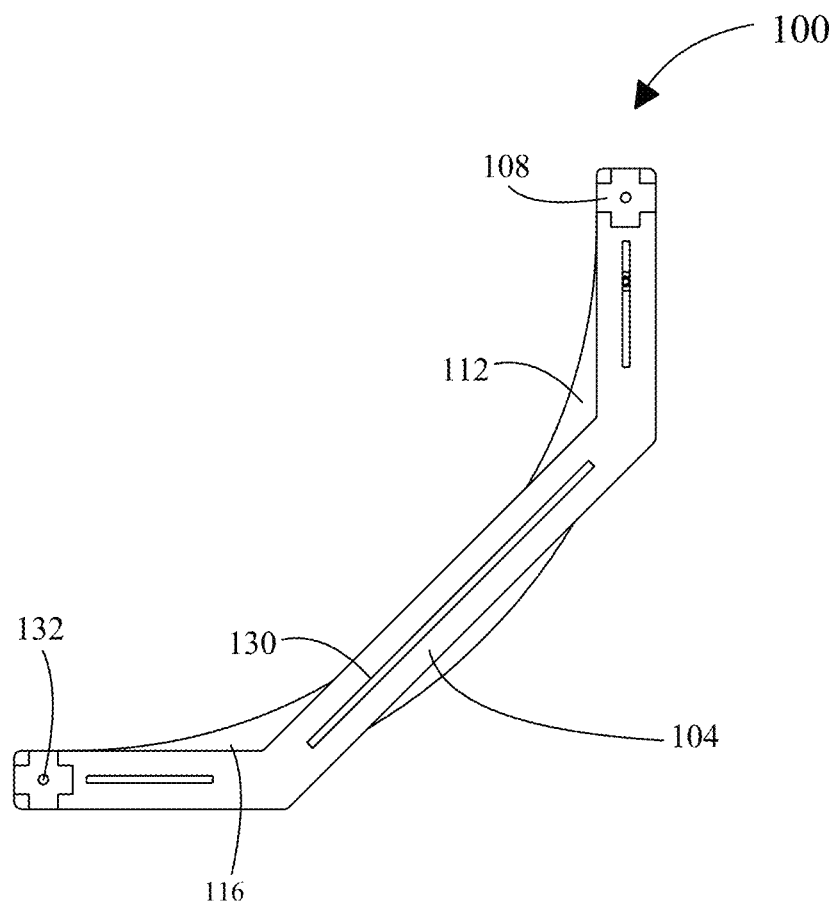

Referring now to the drawings wherein the showings are for purposes of illustrating embodiments of the present invention only, and not for purposes of limiting the same, FIGS. 1A-1C illustrate various views of a first exemplary embodiment of scratching structure assembly. FIG. 1A shows a front, left, and bottom perspective view of an assembly 100. Assembly 100 includes a scratching structure 112 with a proximal end 116 and a distal end 120 (shown in FIG. 1B). Scratching structure 112 may be various shapes and sizes. For example, and without limitation, scratching structure 112 may include a curved surface, such as a single-curved surface, as shown in FIG. 1A. Assembly 100 may be mounted to vertical surface 140 so that scratching surface 112 may be readily accessible to a cat for scratching or climbing atop of. Assembly 100 may be mounted to a vertical surface in various orientations. For example, and without limitation, assembly 100 may be mounted to vertical surface 140 so that proximal end 116 faces vertical surface 140 and the bottom of scratching structure 112 is directed at the ground, so that a cat may position itself in the trough of the curved surface of scratching structure 112. In one or more embodiments, scratching surface 112 may include a fibrous coating, as previously described in this disclosure. In other embodiments, scratching structure may not include a fibrous material. For example, and without limitation, the entirety of scratching structure may be constructed from a carboard material that does not have a coating but rather is left exposed.

As shown in FIG. 1B, which illustrates a bottom plan view of assembly 100, proximal end 116 and/or distal end 120 may each attach to a mounting frame 104, which in turn may be mounted to and thus abut a vertical surface, such as a vertical surface 140 (shown in FIG. 1). Mounting frame 104 may include a wall-facing surface 144 that abuts vertical surface 140 when assembly 100 is affixed to vertical surface 140 using that particular mounting frame. Mounting frame may also include a structure-facing surface that faces away from vertical surface and may abut a portion of scratching structure 112. Mounting frame 104 may run along proximal end 116 and/or distal 120. Mounting frame 104 may be attached to proximal end 116 or distal end 120, allowing assembly 100 to be mounted to vertical surface in any desired orientation. Furthermore, in some nonlimiting embodiments, mounting frames 104 may be mounted to each proximal end 116 and distal end 120 so that assembly may be attached to two vertical surfaces simultaneously. For example, and without limitation, assembly 100 may be attached to and disposed between two opposing walls.

As shown in FIG. 1C, which illustrates a front elevational view of assembly 100, mounting frame 104 may be positioned along and attached to an edge of scratching structure 112. As understood by one of ordinary skill in the art, mounting frame 104 may be various shapes and sizes, as discussed further in this disclosure. In some embodiments, scratching structure 112 may be partially or completely solid. In other embodiments, scratching structure 112 may be partially or completely hollow. Scratching structure 112 may be hollow to lessen a weight of assembly 100 and thus reduce forces exerted in a vertical wall by assembly 100.

Figure 2:
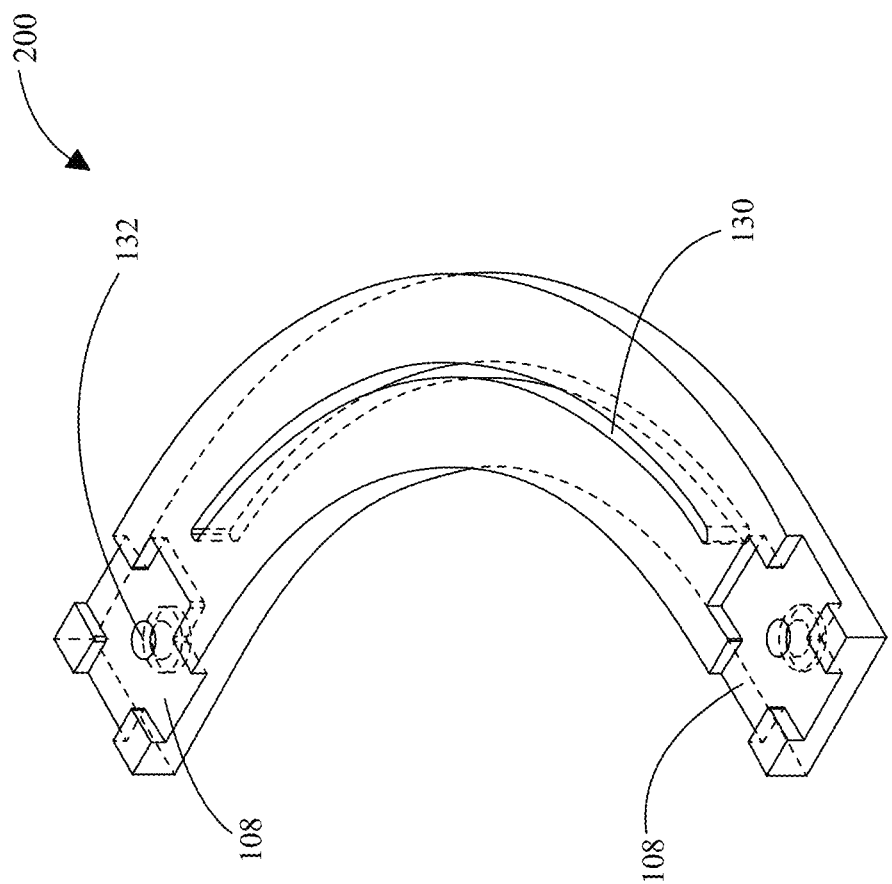
FIG. 2 is a schematic diagram of an exemplary embodiment of a mounting frame in accordance with one or more embodiments of the present disclosure.

Now referring to FIG. 2, an exemplary embodiment of mounting frame is shown. Mounting frame 104 may include a curved shape, as shown in FIG. 2. In other embodiments, mounting frame may be an angular shape, as shown in FIGS. 1A-1C. Mounting frame may be composed of from various materials, such as a metal alloy, wood, a polymeric material, fiberglass, any combination thereof, or the like. As previously mentioned, mounting frame may be various shapes and sizes. For example, and without limitation, mounting frame may be the same shape as an edge, such as proximal end 116, of scratching structure 112, such as mounting frame 104 (shown in FIG. 1) and mounting frame 200 (shown in FIG. 2). In other embodiments, mounting frame may be a shape that is complementary to an edge of scratching structure, such as mounting frame 106. As understood by one of ordinary skill in the art, mounting frame may be any shape that allows for assembly to be securely attached to vertical surface 140.

Now referring to FIG. 3A, a cross-sectional view of assembly 100 taken along line 3-3 of FIG. 1B is shown. In one or more embodiments, assembly 100 may include one or more attachment mechanisms, such as one or more slots, screws, posts, bores, or the like, as discussed previously in this disclosure. In a nonlimiting embodiment, an attachment mechanism 312 of assembly 100 may include a screw 304 and a slot 130, which is configured to receive screw 304 to affix mounting frame 104 to vertical surface 140, thus securing assembly 100 to vertical surface 140 and/or preventing assembly 100 from rotating relative to vertical surface 140. In some embodiments, slot 130 may be a longitudinal slot that extends along at least a portion mounting frame 104. Slot 130 may allow for screw 304 to be inserted therethrough and into proximal end 116 of scratching structure 112. In some embodiments, screw 304 may be received by a threaded bore of scratching structure 112. In other embodiments, scratching structure 112 may include a penetrable material, such as cardboard, wood, or the like, that screw 304 may puncture through. In one or more embodiments, screw 904 may extend from distal end 120 of scratching structure 112 and be received by a slot 130 of a second assembly, which may be indirectly secured to vertical surface 140 by being attached to a first assembly using attachment mechanism.

In one or more nonlimiting embodiments, assembly 100 may include a retention mechanism 316. Retention mechanism 316 of assembly 100 may include a post, such as screw 304, being inserted into an aperture 132 of mounting frame 104 and at least partially through scratching structure 112, such as through a bore 308 of scratching structure 112. In some embodiments, post may traverse completely through an end 128 of scratching structure 112 to provide support to scratching structure 112. In other embodiments, post may be inserted only partially into scratching structure 112, connecting mounting frame 104 to scratching structure 112.

Figure 3B:
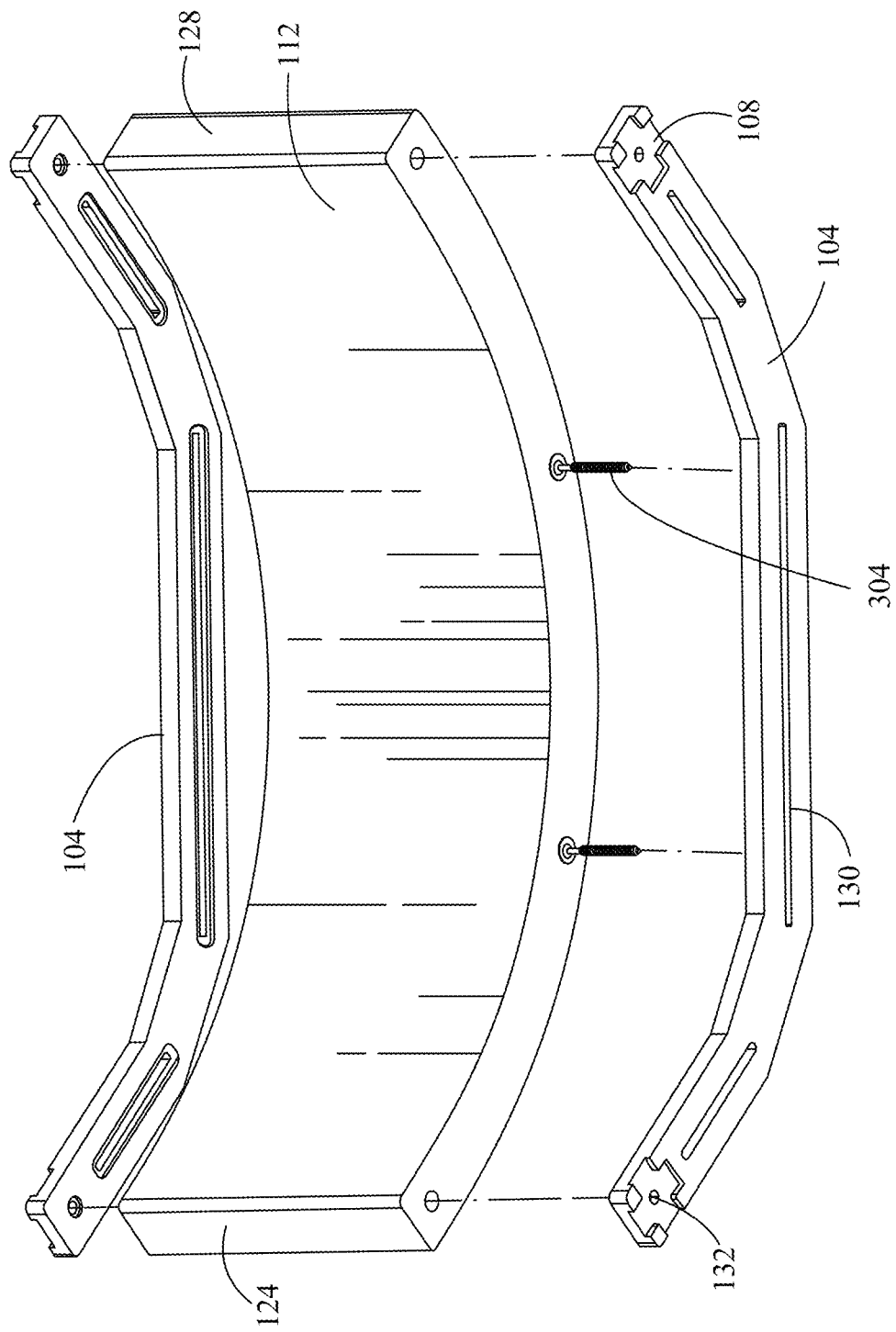
FIG. 3B is an exploded perspective view of the exemplary embodiment of the assembly

Now referring to FIG. 3B, in one or more embodiments, assembly 100 may include a depression 108 of mounting frame 104 that may act as a component of retention mechanism 316. When assembly 100 is mounted to vertical surface 140, depression 108 may be facing vertical surface 140. Depression 108 may be various shapes or sizes. For example, and without limitation, depression 108 may be a cruciform (as shown in FIGS. 1A and 1C). Depression 108 may be an imprinted shape that is receded relative to the rest of a wall-facing surface of mounting frame 104. Retention mechanism 316 may include any structural element formed to prevent rotation of mounting frame 104 relative to vertical surface 140 when mounting frame 104 is attached to vertical surface 140. For instance, and without limitation, retention mechanism 316 may include one or more surface irregularities that increase static coefficient of friction between surfaces, causing greater resistance to rotation; this may have the effect of preventing accidental loosening and/or detachment of assembly 100 from vertical surface 140.

Figures 4A, 4B:
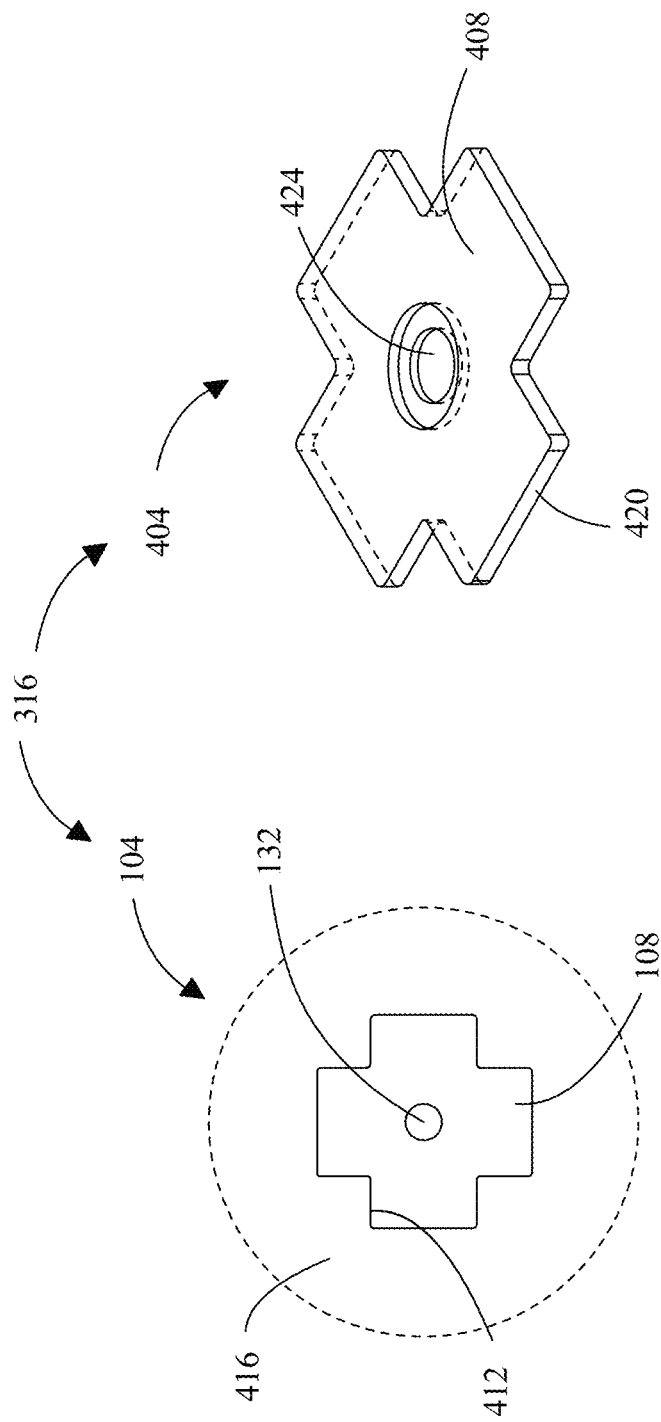
FIGS. 4A and 4B are schematic diagrams of an exemplary embodiment of a retention mechanism in accordance with one or more embodiments of the present disclosure.

Now referring to FIGS. 4A and 4B, exemplary embodiments of one or more components of a retention mechanism 316 are shown. As shown in FIG. 4A, mounting frame 104 may include depression 108. Depression 108 may receive an insert, such as insert 404 (shown in FIG. 4B). Insert 1004 may be a complementary shape relative to depression so that insert may be completely received by depression 108 and cover a receded surface of depression 108. For example, and without limitation, insert 404 may be a cruciform shape, as shown in FIG. 4B. Insert 404 may have a height that is relatively the same as depression 108 so that, when disposed within depression 108, a wall-facing surface 408 of insert 404 may be flush with a wall-facing surface 416 of mounting frame 104. Depression 108 may include one or more abutment surfaces 412, such as along a defining edge of depression 108, that may at least partially contact a complementary abutment surface 420 of insert 404. A post may traverse through a hole 424 of insert 404 and into aperture 132 of mounting frame 104.

Figure 5A:
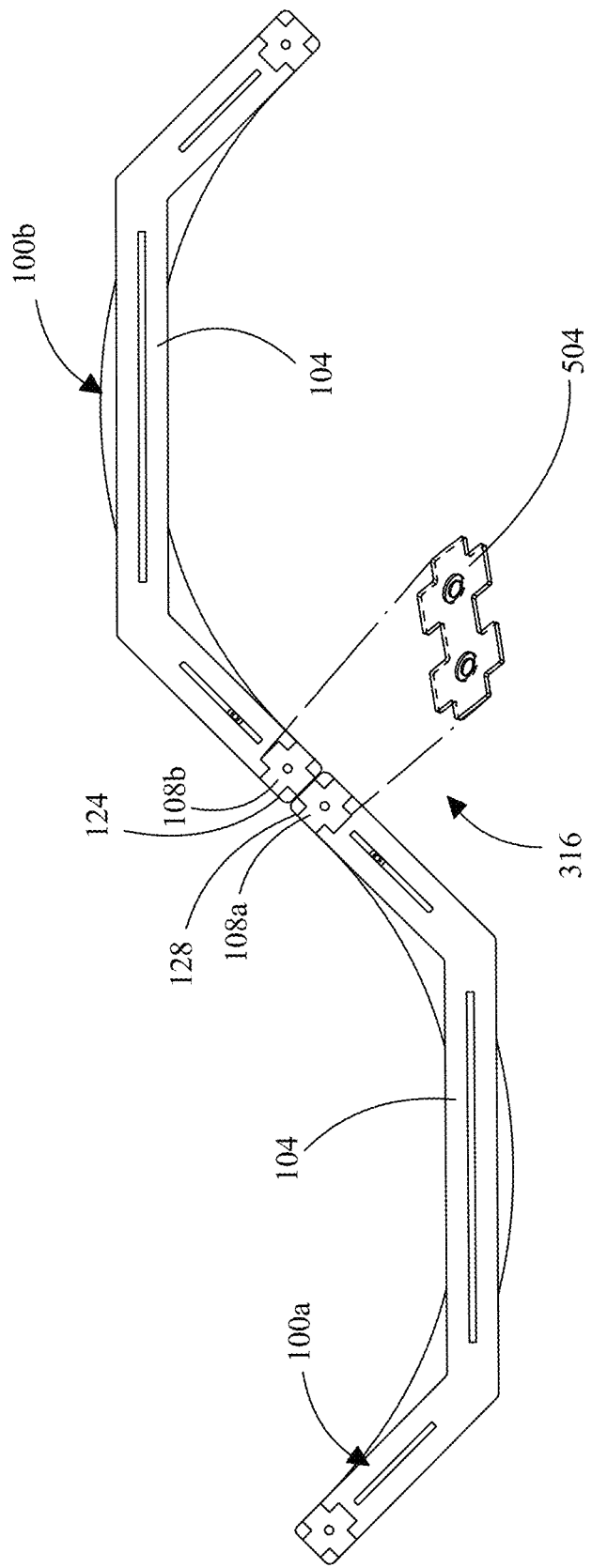
FIGS. 5A and 5B are schematic diagrams of an exemplary embodiment of an arrangement of the assembly in accordance with one or more embodiments of the present disclosure.
Figure 5B:
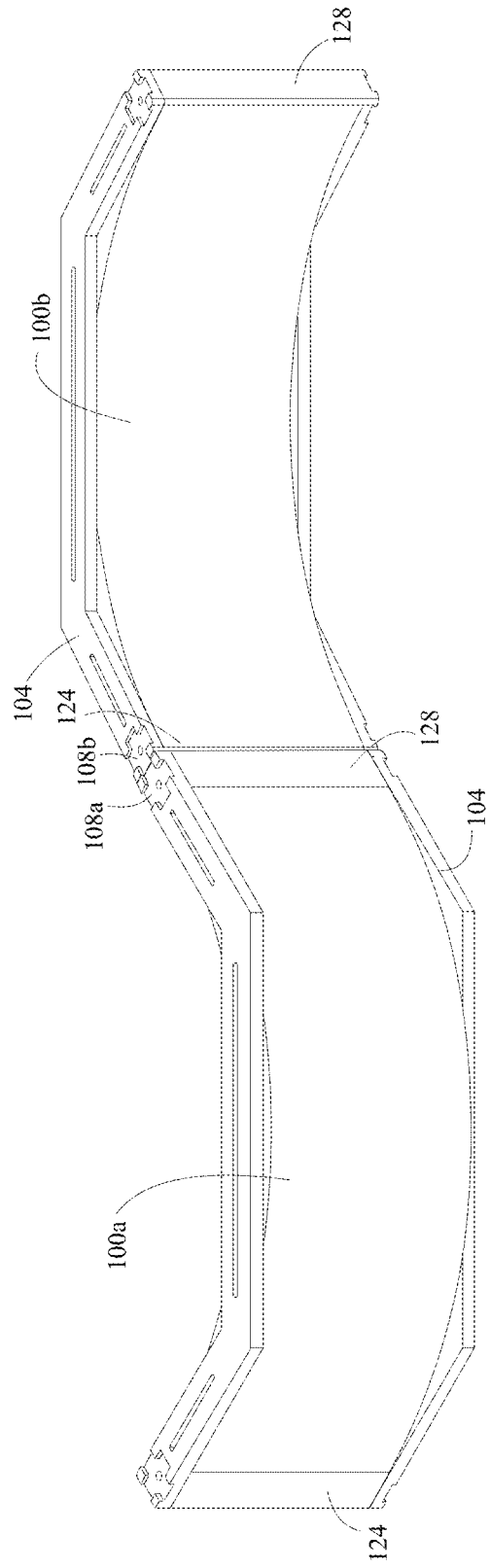

Now referring to FIGS. 5A and 5B, various views of an exemplary arrangement of assembly 100 are shown. As previously mentioned, assembly 100 may be arranged in various positions relative to vertical surface 140. For example, and without limitation, assembly 100 may be oriented so that a bottom surface of scratching structure 112 faces the ground. In another example, and without limitation, assembly 100 may be oriented so that the bottom surface of scratching structure 112 faces away from the ground, such as for example toward a ceiling.

Figure 11:
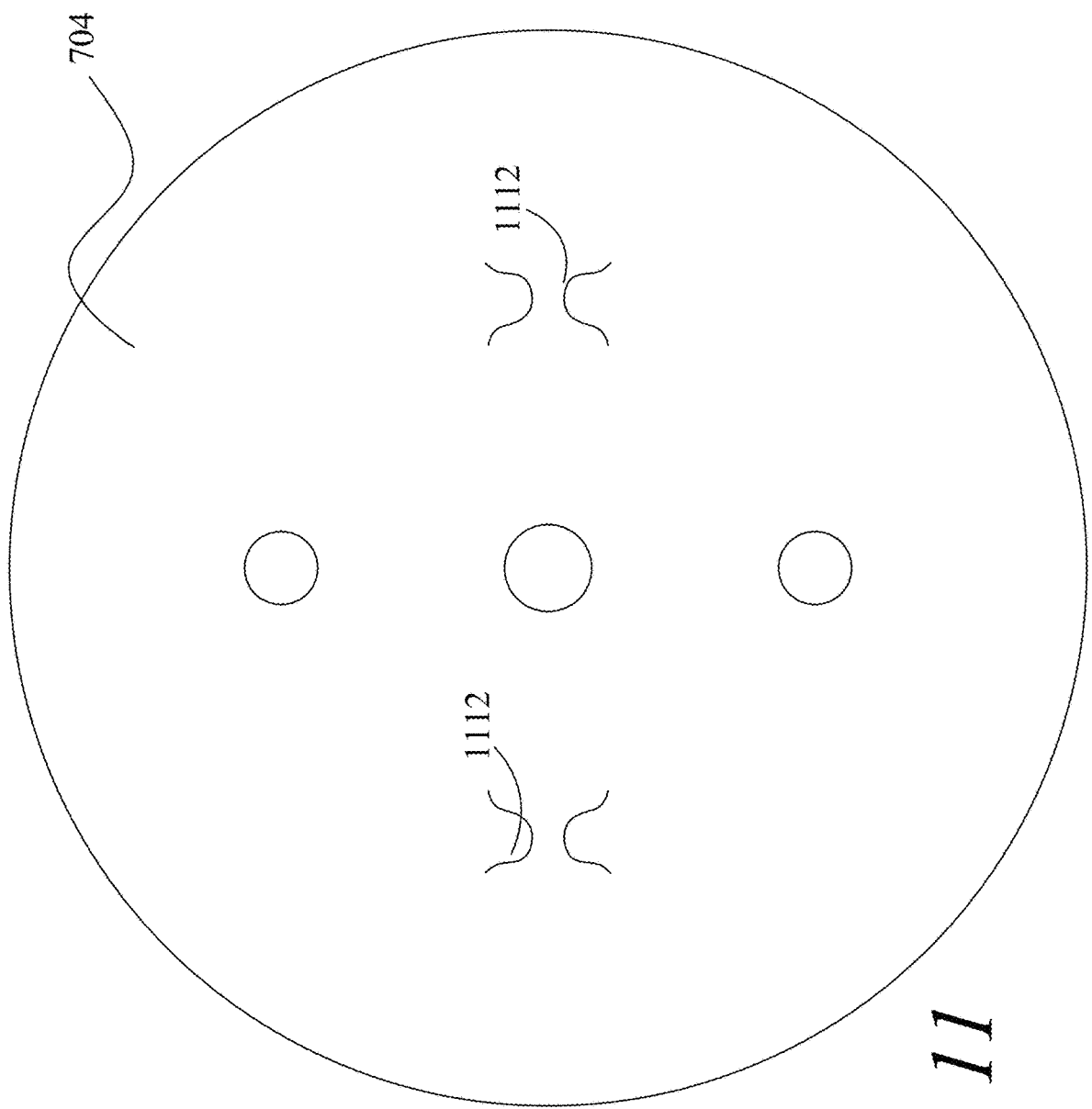
FIG. 11 is a schematic diagram of an exemplary embodiment of a mounting plate in accordance with one or more embodiments of the present disclosure.

In one or more embodiments, two or more assemblies 100 may be connected to each other using retention mechanism 316. For instance, and without limitation, ends of assembly may be positioned near each other or abut each other so that a single insert 504 may be disposed in depressions 108 of each assembly 100. For example, and without limitation, a second end 128 of a first assembly 100a may abut a first end 124 of a second assembly 100b so that a depression 108a of first assembly 100a is adjacent to a depression 108b of second assembly 100b, thus allowing an insert 504 to be disposed within both depressions 108a,b simultaneously and act as a connector for assemblies 100a and 100b. Insert 1104 may be a shape that is complementary to a shape defined by both depressions 108a,b, such as, for example, a two-barred cross, as shown in FIG. 11. A single insert 504 to adjoin adjacent assemblies 100a,b may prevent movement of assemblies 100a,b relative to each other. Additionally or alternatively, adjoining adjacent assemblies 100a,b creates a continuous surface for a cat to maneuver along. In some embodiments, another insert 504 may also be disposed in depressions 108 of mounting frame 104 at the distal end 120 of scratching structure 112 to further secure assemblies 100a,b to each other.

Figure 6A:
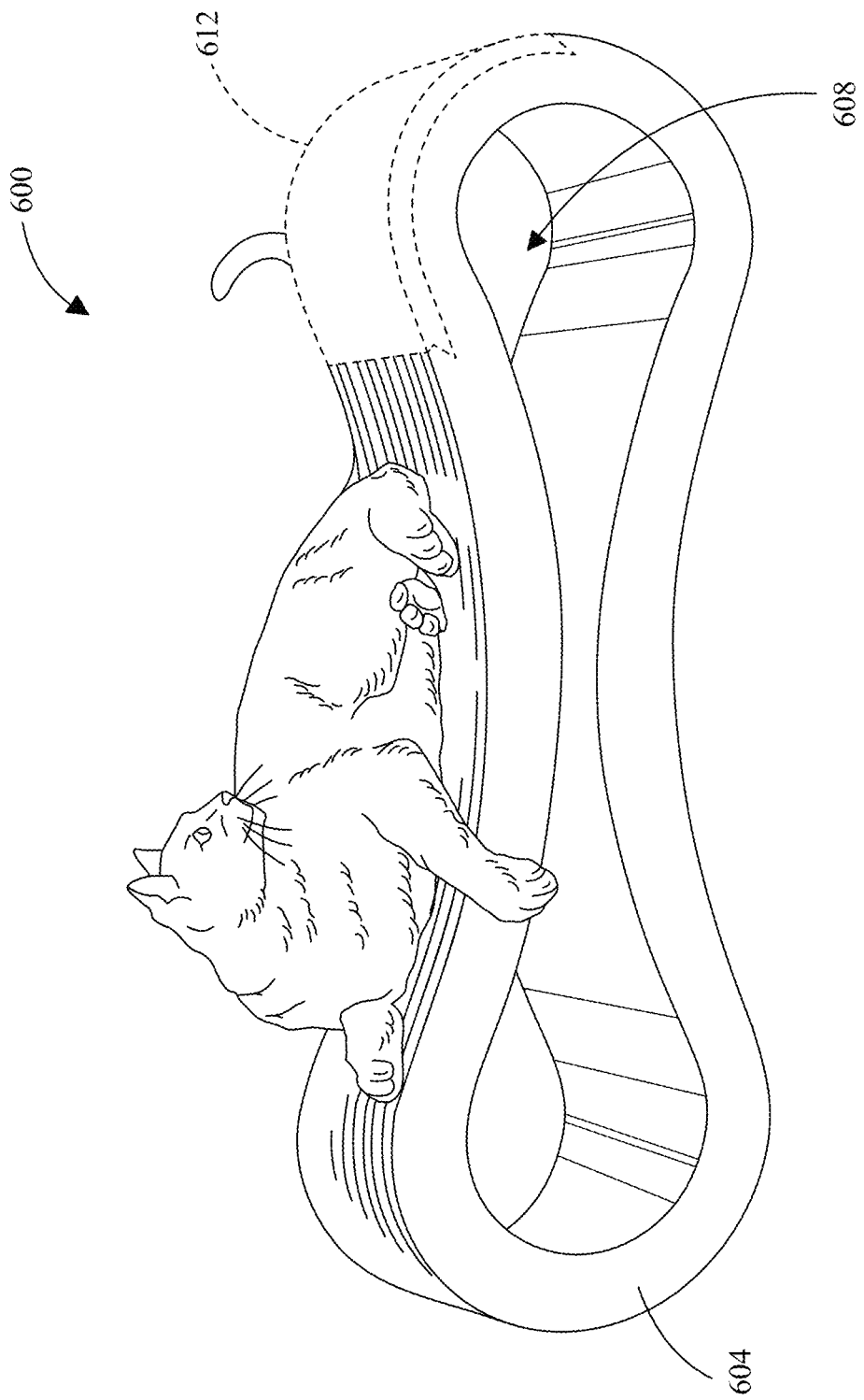
FIG. 6A is a schematic diagram of an exemplary embodiment of a scratching structure in accordance with one or more embodiments of the present disclosure.
Figure 6B:
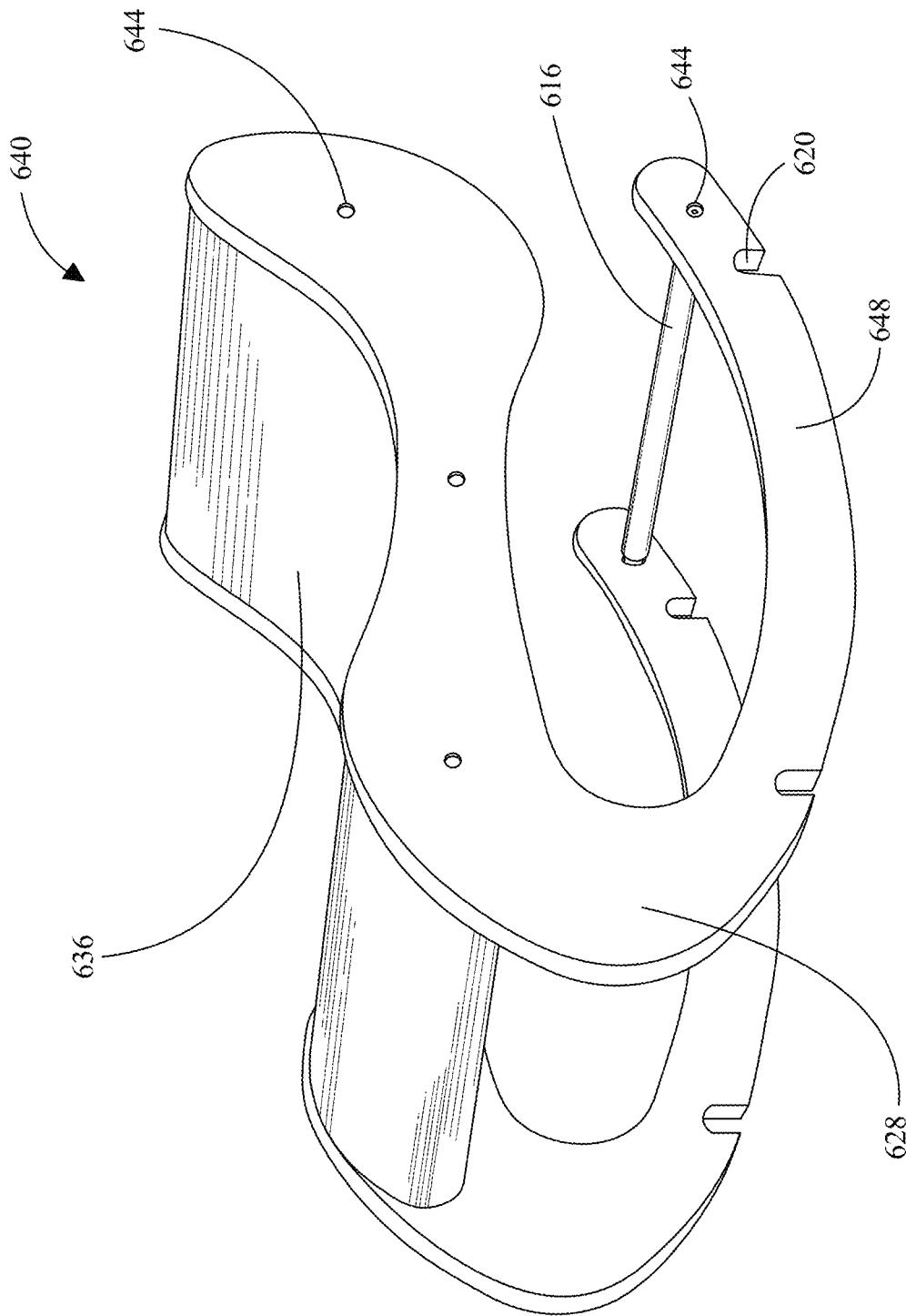
FIG. 6B is a schematic diagram of an exemplary embodiment of a scratching structure in accordance with one or more embodiments of the present disclosure.

Now referring to FIGS. 6A and 6B, various exemplary embodiments of scratching structure are shown is shown. In FIG. 6A, an exemplary embodiment of scratching assembly 600 is shown. As previously mentioned, scratching surface may be various shapes and sizes. For example, and without limitation, assembly 600 may include a scratching surface 604 that is a saddle shape, or a semi-collapsed toroidal shape, where scratching surface 604 defines an opening 608. In one or more embodiments, scratching surface 604 may include one or more removeable regions, such as removeable region 612. For instance, a cat may favor a particular area of a scratching surface, which may result in more extensive wear in one specific area of a scratching structure that the remaining area of the scratching surface; thus, an area that is known to be more often favored by a cat, such as a corner or a curved end, may be made readily removeable so the area may be replaced without having to replace the entire scratching structure 604. For example, and without limitation, a removeable region 612 may include a separate component that may be slidably attached or detached from the rest of scratching structure 604. When removeable region 612 has been severely worn by a cat, such as by clawing at the particular area, then replaceable region 612 may be slidably removed from scratching structure 604 and replaced by a new replaceable area being slidably attached to scratching structure 604.

In FIG. 6B, another exemplary embodiment of a scratching assembly 640 is shown. Scratching surface 636 may include a convex surface. In one or more embodiments, a frame 628 of assembly 640 may be various shapes and sizes, as previously mentioned. For example, and without limitation, frame 628 may include a curved, or bowed, frame, where frame may be configured to be mounted to a vertical surface or readily removed from the vertical surface and placed on a horizontal surface, such as a floor. Frame 628 may include legs 648 that a cat may use for climbing or that may provide support for assembly 640 when placed on the floor. Legs 648 may include notches, such as notches 620, which may receive at least a portion of a slat to provide additional structural support to legs 648 for climbing or hanging. Slats inserted into notches 620 may also be used to prevent rocking of assembly 640 when assembly is placed on the ground. Additionally or alternatively, bar 616 may be attached to each leg 624 to provide structural support without preventing rocking of assembly 640 when assembly 640 is placed on the ground. Holes 644 of frame 628 may be used to affix assembly 640 to a vertical surface. For example, holes 644 may receive a screw or post that is attached to vertical surface using means described in this disclosure.

Still referring to FIG. 6B, base panel may be fixed to vertical surface 140, such as, for example, a wall. Base panel may include one or more apertures that may each receive one or more components of an attachment mechanism and/or retention mechanism of assembly. For example, and without limitation, an aperture of base panel may receive screw 304 of attachment mechanism 312; screw 304 may traverse through aperture and be received by vertical surface 140. In various embodiments, base panel may be secured to vertical surface, and provide protruding screws, such as screw 304 or a post, which may each then be received by apertures or holes of attachment mechanisms and/or retention mechanisms of assemblies 100,700. For example, and without limitation, a user may first mount base panel to vertical surface 140,708 and then affix assembly 100,700 to vertical surface 140,708, respectively, using base panel via means and processes previously described in this disclosure.

Base panel may be composed of various materials as understood by one of ordinary skill in the art. For instance, and without limitation, base panel may be composed of one or more metal alloys, polymers, such as plastic or rubber, fiberglass, wood, fabric, cork, any combination thereof, and the like. For example, and without limitation, base panel may include a steel base panel. In another example, base panel may include a metal alloy base panel having a flexible polymer backing that abuts vertical surface to prevent scratching or marring of vertical surface by base panel while base panel is secured to vertical surface.

Base panel may be various shapes and sizes as understood by one or ordinary skill in the art. For example, and without limitation, base panel may be a size and/or a shape that is complementary to mounting frame or mounting plate. For example, and without limitation, base panel may be circular, polygonal, triangular, rectangular, or any other shape. In other embodiments, base panel may be larger than mounting frame or mounting plate. In a nonlimiting embodiment, base panel may be larger that mounting frame or mounting plate so that a plurality of assemblies may be secured to one base panel. In other embodiments, base panel may be smaller than mounting frame or mounting plate. In a nonlimiting embodiment, base panel may be smaller that mounting frame or mounting plate so that a plurality of base panels may be used to affix an assembly to a vertical surface.

Figure 7:
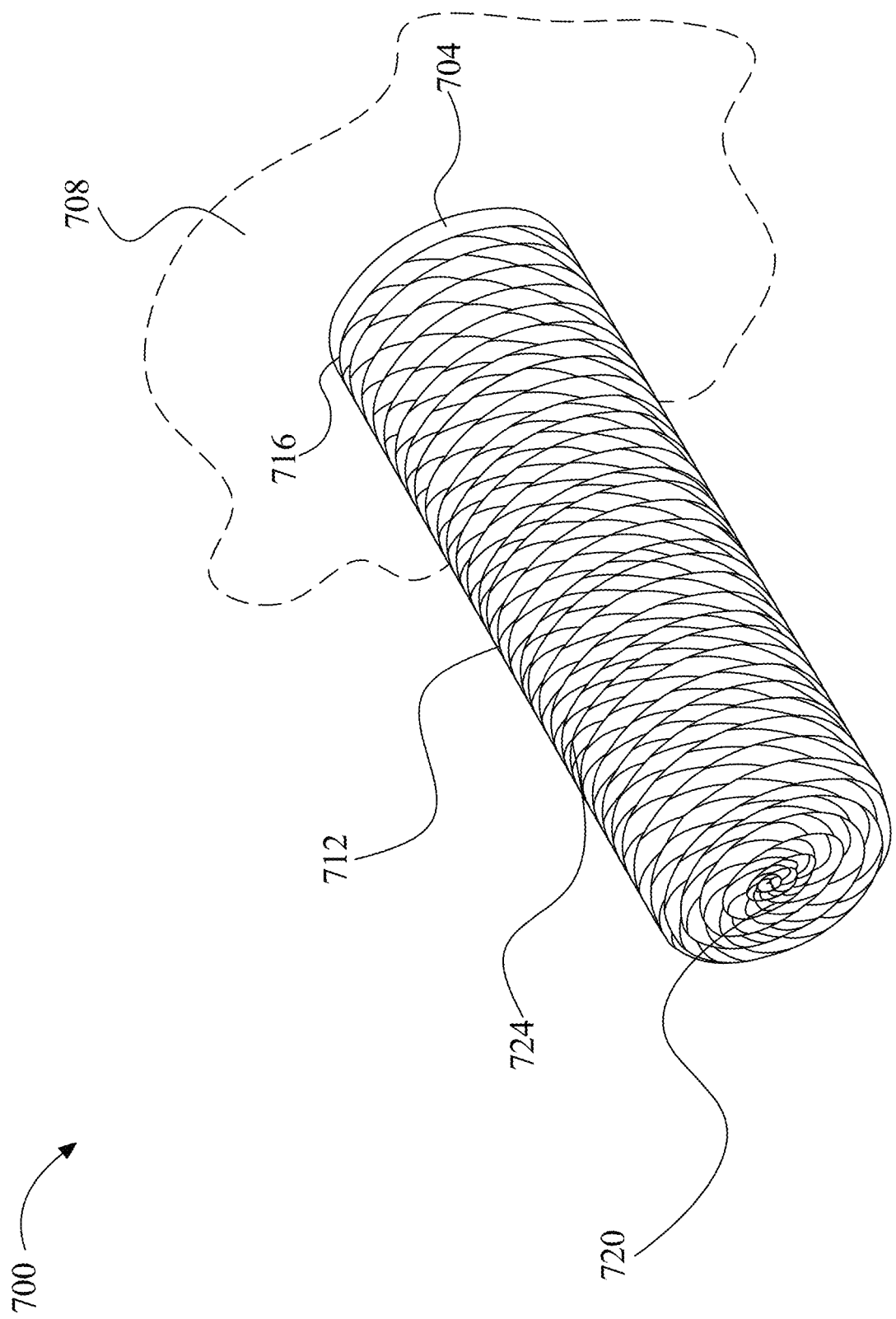
FIG. 7 is an isometric drawing of an exemplary embodiment of a wall-mounted scratch post assembly for cats in accordance with one or more embodiments of the present disclosure.

Now referring to FIG. 7, a second exemplary embodiment of a wall-mounted scratching structure, scratch post assembly 700, which is for use by cats. Assembly 700 includes a mounting plate 704 affixed to a vertical surface 708. Assembly 700 includes a scratch post 712 including a proximal end 716 attached to the mounting plate 704 and a distal end 720 opposite the proximal end 716 and facing away from the vertical surface 708. Scratch post 712 includes a fibrous covering 724. Fibrous covering 724 may form an exterior surface of scratch post 712, upon which a cat may climb, play, rest, and/or sharpen its claws.

Still referring to FIG. 7, vertical surface 708 may include, as a non-limiting example, an interior or exterior wall, an interior or exterior door, a doorframe, a piece of molding or other architectural element of an interior or exterior of a building, a surface of an item of furniture such as a shelving unit, chair, table, or other item, a portion of a ceiling such as a substantially vertical section of a domed or Mansard roof ceiling, a substantially vertical projection from a ceiling, a rafter or cross-beam, a stand such as a "hobby horse" or other item designed to support other objects, whether specially constructed to support assembly 700 or adapted for such support. Vertical surface 708 may be substantially vertical only in the localized area to which mounting plate 704 attaches; that is, vertical surface 708 may include a surface that is vertical, or nearly vertical, only where attachment means of proximal end 716 and/or bracing means as described in further detail below attach to vertical surface 708. "Nearly vertical," as used herein, includes any surfaces that can be locally treated as essentially vertical; for instance, a surface is nearly vertical locally, and therefore substantially vertical as used herein, if the mounting slot and brace may contact the surface at points that may be located on an apparently vertical plane from a user's perspective, regardless of surface forms between those points.

With continued reference to FIG. 7, assembly 700 may be attached to vertical surface 708, permitting a cat to climb upon assembly 700, to sharpen claws thereon, and/or perform other activities, for instance and without limitation as shown. Multiple assemblies may be attached together and/or combined with other pet furniture, for instance to make more complex climbing structures for use and entertainment by cats.

Figure 8A:
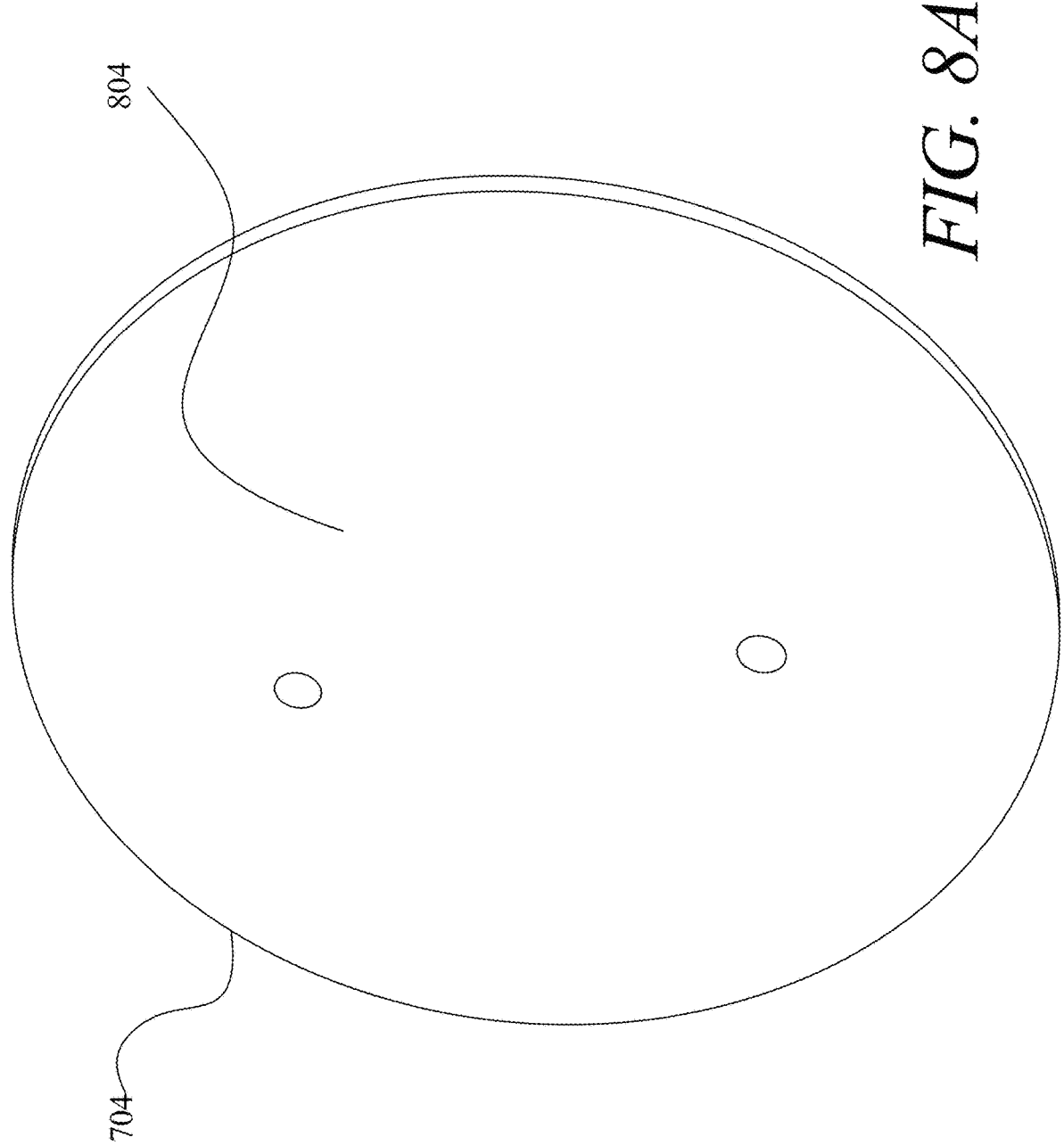
FIG. 8A is a perspective drawing of an exemplary embodiment of a mounting plate in accordance with one or more embodiments of the present disclosure.
Figure 8B:
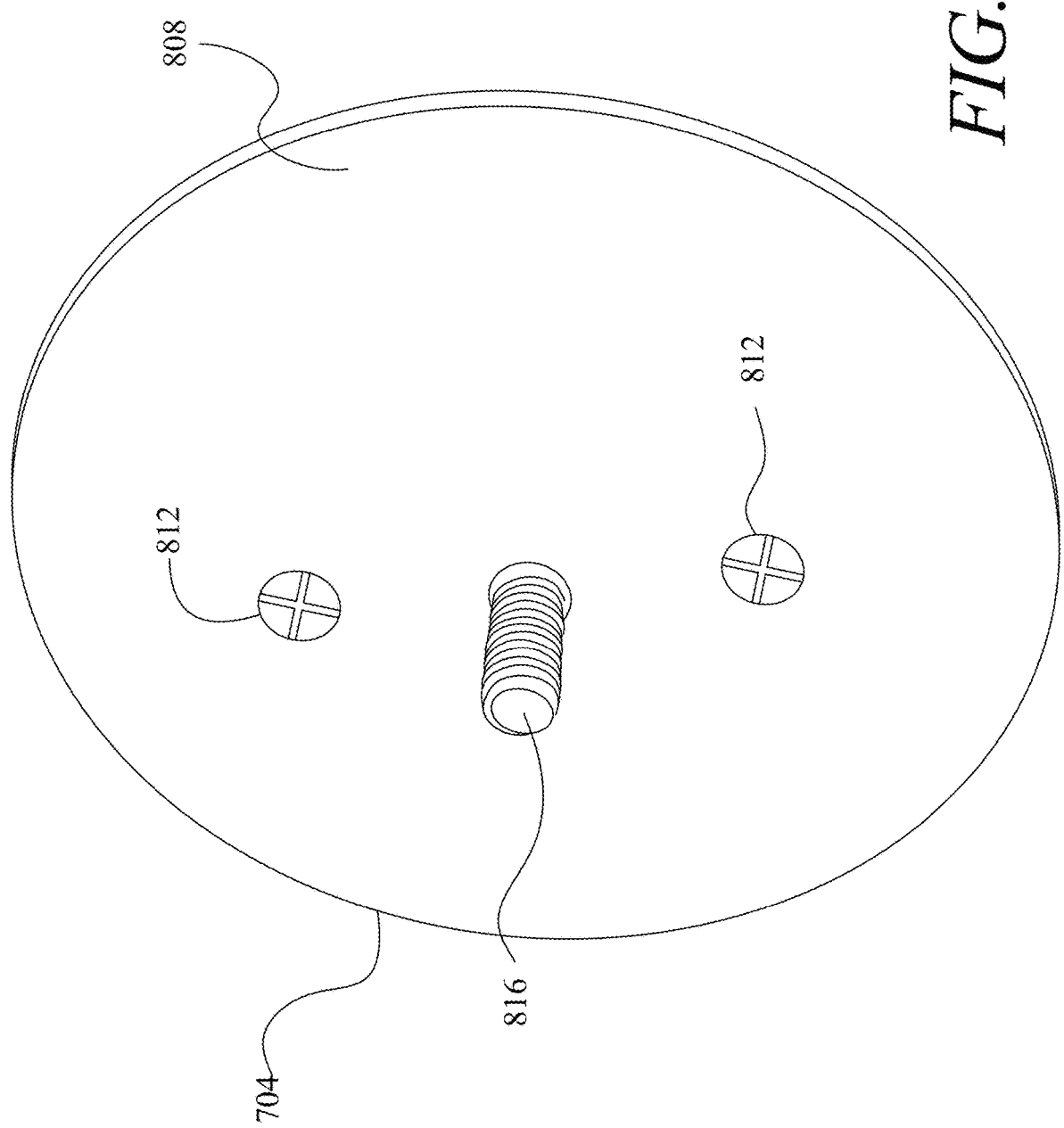
FIG. 8B is a perspective drawing of an exemplary embodiment of a mounting p late in accordance with one or more embodiments of the present disclosure.

Referring now to FIG. 8A, an exemplary embodiment of a mounting plate 704 is illustrated. Mounting plate 704 may include a wall-facing surface 804 mounted against the vertical surface 708. As shown in FIG. 8B, mounting plate 704 includes a post-facing surface facing away from the vertical surface 708; post-facing surface may be parallel, or substantially parallel to wall-facing surface 804, forming a slab-like structure. Cross-sectional form of mounting plate 704 may have any suitable shape, including any combination of curved and/or polygonal forms; cross-sectional form may change from wall-facing surface 804 to post-facing surface, or may remain substantially the same. For instance, and without limitation, post-facing surface may be disc-shaped, and/or mounting plate 704 may be disc-shaped.

With continued reference to FIG. 8B, mounting plate 704 may be composed of any suitable material and/or combination of materials, including without limitation metal such as aluminum, titanium, steel, or the like, plant materials including bamboo and/or wood such as balsa wood, birch, oak, or the like, polymer materials such as polycarbonate, polymethyl methacrylate, acrylonitrile butadiene styrene (ABS), or the like, synthetic fibers such as carbon fiber, silicon carbide fiber, metallic fiber, or the like, composite materials such as fiberglass, laminated fiberglass, plywood, or the like, cardboard, or any combination of the above.

Still referring to FIG. 8B, mounting plate 704 may include a first attachment mechanism 812 affixing the mounting plate 704 to the vertical surface 708. First attachment mechanism 812 may include, without limitation, any element usable to attach one rigid component to another, including one or more nails, rivets, studs, anchors such as drywall anchors, or the like. First attachment mechanism 812 may include a threaded fastener. A threaded fastener may include, as a non-limiting example, a screw, nut, and/or bolt. Screws may be composed of materials which May include wood, sheet metal, plastic, stainless steel, brass, nickel, and/or aluminum. Screws may contain tapered shank or non-tapered shank and may include for example, double ended dowel screws, drive screws, drywall screw, eye screw, lag bolt, mirror screw, sheet metal screw, twin fast screw, wood screw, and/or a security head screw. Nuts may include fasteners that contain a threaded hole and bolts may include threaded fasteners that may contain an external male thread. Nuts may be used together in conjunction with a mating bolt to fasten items together. Nuts may utilize various locking mechanisms such as lock washers, jam nuts, lockwire, castellated nuts, and/or nylon inserts. Nuts may be of a certain size and shape, such as a hexagonal shape. Nuts may be composed of materials which may include steel, stainless steel, bronze, metal, wood plastic, brass, nickel, aluminum, and/or nylon. Nuts may include for example, acorn nut, barrel nut, cage nut, coupling nut, cross dowel nut, flange nut, insert nut, knurled nut, split nut, sleeve nut, square nut, swage nut, T-nut, T-slot nut, weld nut, well nut, wing nut, and/or locknuts. Bolts may include heads that can engage with a tool to tighten them. Heads may be of a specific design and shape to fit with certain tools, such as for example a hexagonal shape that can engage with tools such as a wrench or screwdriver. Nuts and bolts may be composed of materials which may include steel, stainless steel, bronze, metal, wood, plastic, brass, nickel, aluminum and/or nylon. Bolts may include for example, anchor bolts, arbor bolts, carriage bolts, elevator bolts, hanger bolts, hex bolts, J bolts, lag bolts, rock bolts, sex bolts, shoulder bolts, and/or U-bolts. First attachment mechanism 812 may be used, without limitation, to attach mounting plate 704 to a structurally strong element of and/or behind vertical surface 708, such as without limitation a wooden and/or metal stud, or other building and/or wall frame element.

Further referring to FIG. 8B, mounting plate 704 includes a second attachment mechanism 816 attached to the post-facing surface. Second attachment mechanism 816 may be attached to post-facing surface by any suitable manner, including welding, adhesion, riveting, engineering fits, or the like. Second attachment mechanism 816 may be manufactured simultaneously with mounting plate 704 and/or post-facing surface, for instance via a machining, molding, casting, additive manufacturing, or other process that forms both mounting plate 704 and second attachment mechanism 816 together. Second attachment mechanism 816 may include without limitation a threaded projection from post-facing surface, such as a bolt projecting from post-facing surface. Second attachment mechanism 816 may alternatively or additionally include a threaded hole, such as a nut integrated in and/or affixed to second attachment mechanism 816, into which a reciprocally threaded bolt may be screwed. Alternatively, second attachment mechanism 816 may include one or more latches and/or portions of latches, such as a mechanism having a biasing means and wedge cam or the like that deforms the mechanism against the biasing means, causing it to snap into a position retaining a reciprocal structure such as a slot or depression into which a projection of mechanism may be inserted under a recoil force imposed by biasing means; alternatively, such a slot or depression may be on second attachment mechanism 816 and a structure as described above on another component may latch to slot or depression. Two structures on different components that latch together maybe referred to as reciprocal latching elements. Persons skilled in the art, upon reviewing the entirety of this disclosure, will be aware of various alternative or additional forms that latches and/or attachment mechanisms may take consistently with this disclosure. Second attachment mechanism 816 may be located at any suitable point and/or points on post-facing surface. For instance, and without limitation, second attachment mechanism 816 may be located at a geometric center of the post-facing surface.

Figure 9:
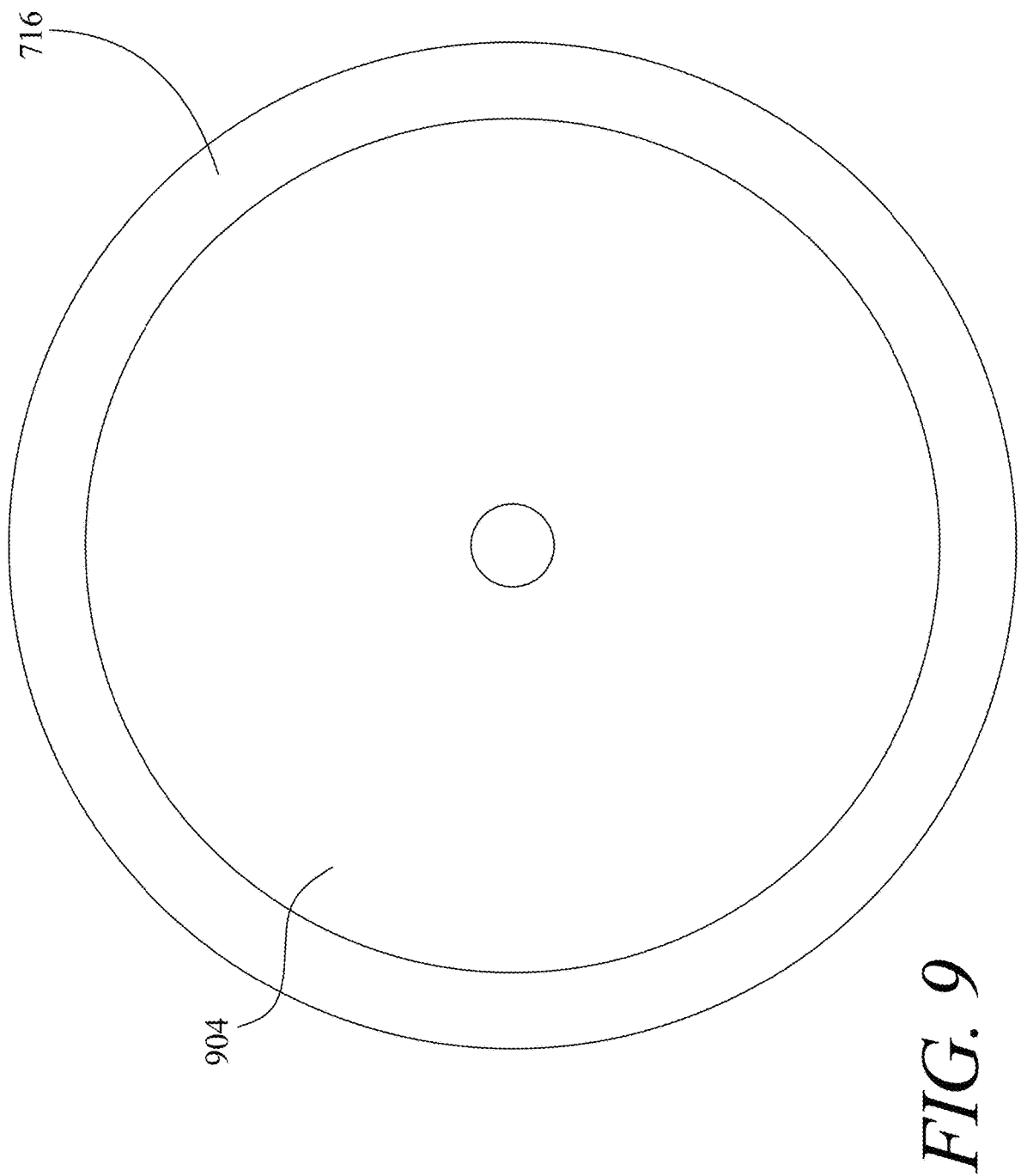
FIG. 9 is a schematic diagram of an exemplary embodiment of a proximal surface in accordance with one or more embodiments of the present disclosure.

Referring now to FIG. 9, scratch post 712 includes a proximal end 716. Proximal end 716 attaches to mounting plate 704. Proximal end 716 includes a proximal surface 904 formed to fit against the post-facing surface. Proximal surface 904 may be composed of any material and/or combination of materials suitable for composition of mounting plate 704.

Figure 10:
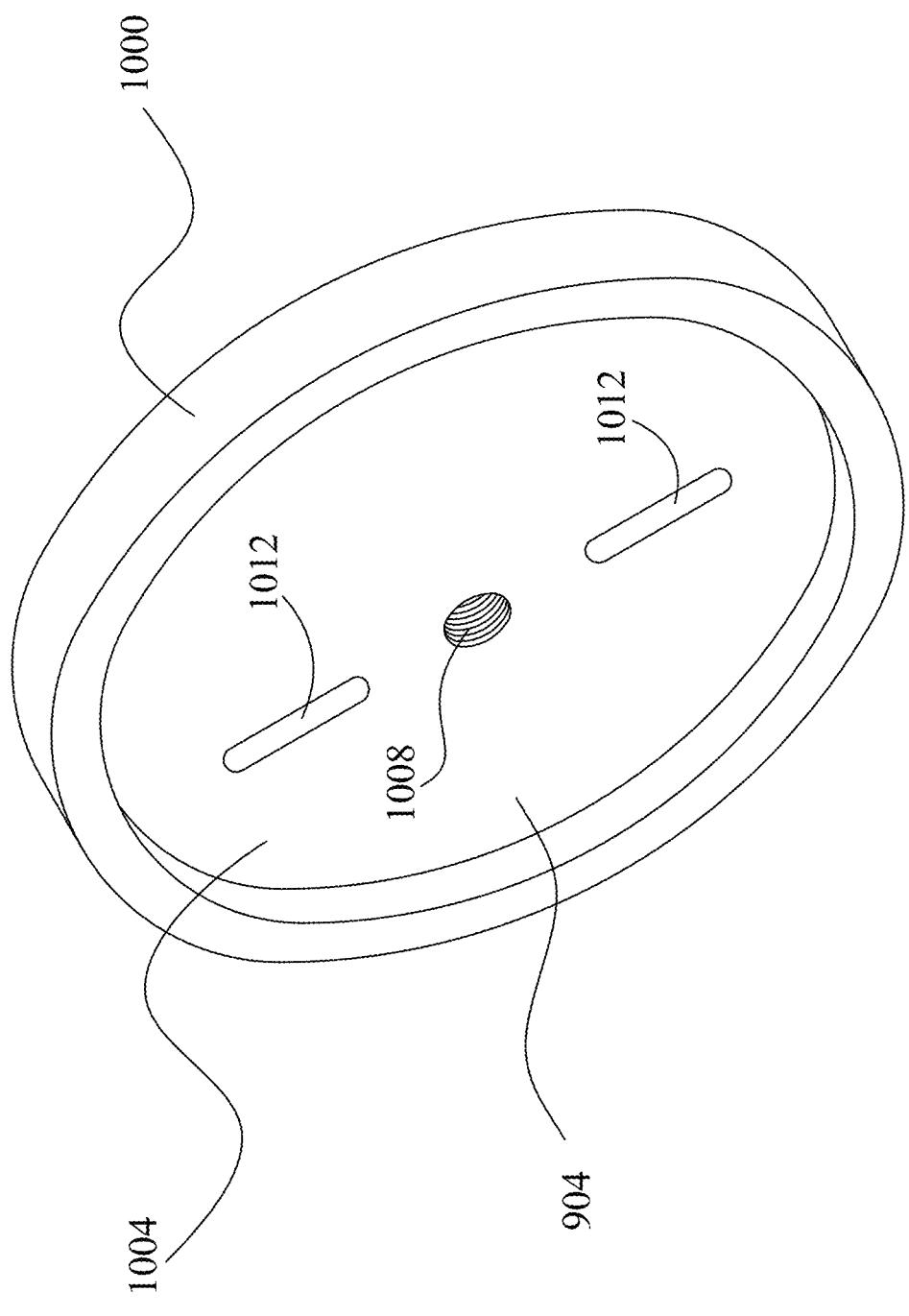
FIG. 10 is a schematic diagram of an exemplary embodiment of a proximal end plate in accordance with one or more embodiments of the present disclosure.

Referring now to FIG. 10, proximal end 716 may include a proximal end plate 1000, which may be composed of any material and/or combination of materials suitable for composition of mounting plate 704, including without limitation metal, plastic, combinations of metal and plastic, or the like; proximal end 716 surface may include a surface of the proximal end plate 1000. Proximal end plate 1000 may be inserted into proximal end 716; for instance, proximal end plate 1000 may fit into a hollow portion of proximal end 716, for instance and without limitation such that proximal surface 904 of proximal end plate 1000 is flush with proximal end 716. Proximal surface 904 may include a recess 1004 that fits around the mounting plate 704. For instance, where mounting plate 704 includes a disc-shape and/or substantially disc-shaped body, proximal surface 904 may include a disc-shaped and/or cylindrical depression and/or recess 1004 into which mounting plate 704 fits snugly, such that a recessed portion of proximal surface 904 fits against pole-facing surface 808 upon attachment. In embodiment, mounting plate 704 may fit into recess 1004 such that wall-facing surface 804 is flush or nearly flush with non-recessed portions of proximal surface 904 when pole-facing surface 808 is against a recessed portion of proximal surface 904. As a result, scratch post 712 may appear to attach directly to vertical surface 708, with no mounting plate 704 visible, when assembly 700 is fully assembled.

Still referring to FIG. 10, proximal surface 904 may include a third attachment mechanism 1008 that attaches to the second attachment mechanism 816; attachment of third attachment mechanism 1008 to second attachment mechanism 816 may press proximal surface 904 against pole-facing surface 808, effecting a secure and fixed attachment of scratch post 712 to mounting plate 704, and thus to vertical surface 708. As a non-limiting example, where second attachment mechanism 816 includes a threaded projection from post-facing surface as described above, such as a bolt projecting from post-facing surface, third attachment mechanism 1008 may include a reciprocally threaded hole, which may be attached to second attachment mechanism 816 by screwing the hole and/or scratch post 712 onto threaded projection. Where second attachment mechanism 816 includes a threaded hole, such as a nut integrated in and/or affixed to second attachment mechanism 816, third attachment mechanism 1008 may include a reciprocally threaded bolt that may be screwed into the hole. Alternatively or additionally, third attachment mechanism 1008 may include any latch and/or reciprocal latching element, as described above, that latches with second attachment mechanism 816.

Still referring to FIG. 10, at least one of proximal surface 904 and post-facing surface may include a retention mechanism 1012. Retention mechanism 1012 may include any structural element formed to prevent rotation of proximal end 716 surface relative to post-facing surface when proximal end 716 surface is fitted against post-facing surface. For instance, and without limitation, retention mechanism 1012 may include one or more surface irregularities that increase static coefficient of friction between surfaces, causing greater resistance to rotation; this may have the effect of preventing accidental loosening and/or detachment of scratching post from mounting plate 704. Projections may have any suitable form, including a form of ridges, depressions, bumps, or the like.

Now referring to FIG. 11, illustrated is an exemplary embodiment of mounting plate 704 having a retention mechanism 1112 on post-facing surface that may reciprocally engage a retention mechanism 1112 on a proximal surface 904. Alternatively or additionally, retention mechanism may include an adhesive, which may be applied to proximal end surface, post-facing surface, second attachment mechanism, and/or third attachment mechanism. Adhesive may include, without limitation, a thread locker applied to threads of second attachment mechanism and/or third attachment mechanism, where a "thread locker" is an adhesive applied to threads of a threaded attachment mechanism to resist rotation of the attachment mechanism, preventing loosening.

Figure 12:
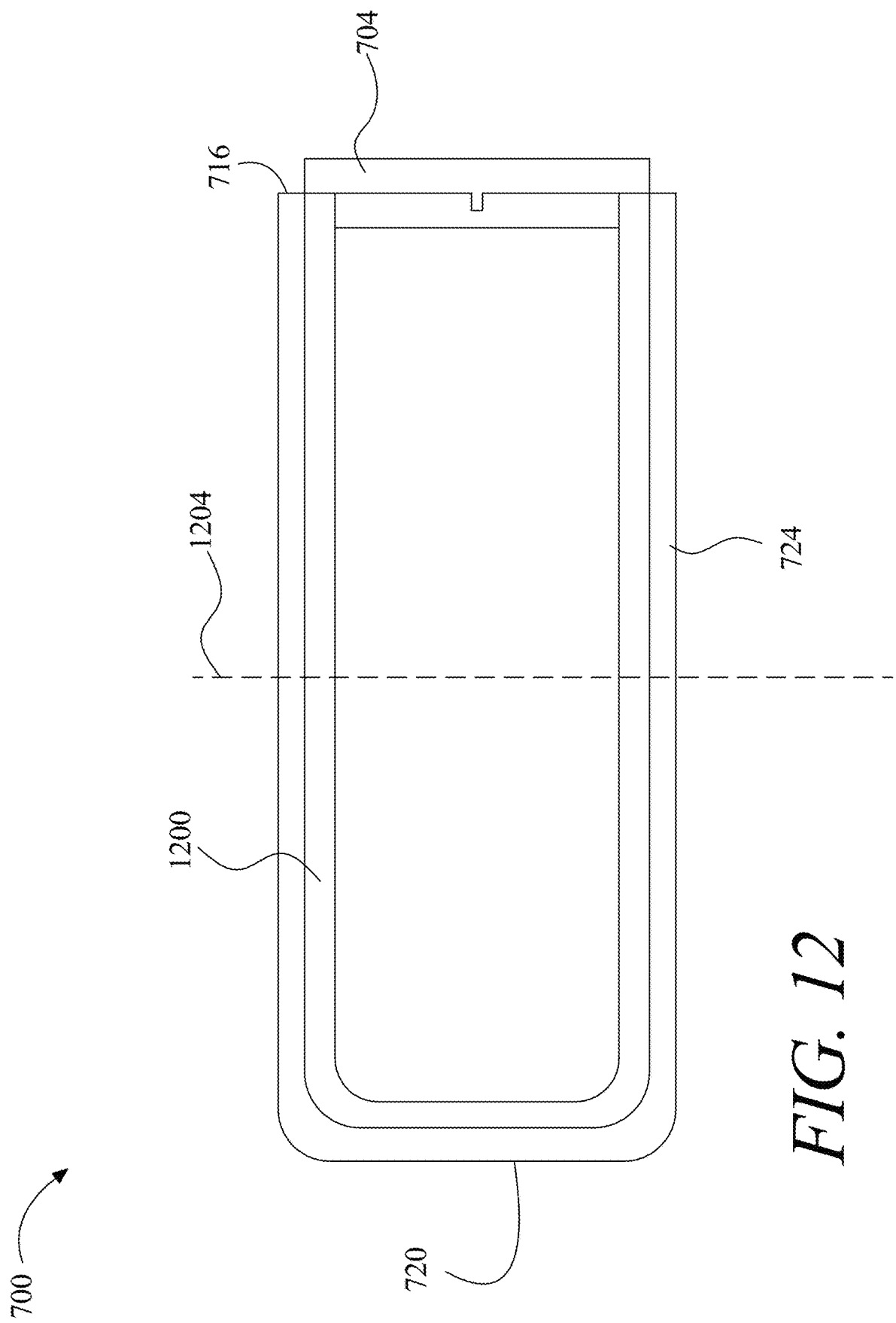
FIG. 12 is a schematic diagram of a longitudinal cross-section of an exemplary embodiment of a wall-mounted scratch post assembly for cats in accordance with one or more embodiments of the present disclosure.

Referring now to FIG. 12, a longitudinal cross-sectional view of a non-limiting embodiment of assembly 700 is illustrated. Scratch post 712 includes a support structure 1200 connecting proximal end 716 to distal end 720. Support structure 1200 may be composed of any material and/or combination of materials suitable for composition of mounting plate 704. Support structure 1200 may have any suitable exterior shape; for instance, support structure 1200 may be cylindrical and/or substantially cylindrical, and/or may have any curved and/or polyhedral form and/or combination thereof. Interior structure of support structure 1200 may be substantially hollow, solid, and/or include a combination of voids and solid structure. For instance, an interior space of support structure 1200 may include one or more internal bracing elements, such as triangular bracing made up of sheets or walls of rigid material. Bracing elements and voids may form any suitable configuration, including without limitation honeycomb construction. Support structure may, without limitation, be constructed of a hollow tube with a cap at a distal end of support structure, where distal end is at distal end 720; cap may be constructed of any material suitable for construction of mounting plate and/or proximal end plate.

In an embodiment, and still referring to FIG. 12, a weight and/or mass of scratch post 712 and/or assembly 700 may be biased to one end or the other, such as without limitation biasing the weight and/or mass of scratch post 712 to proximal end 716. For instance, and without limitation, center of mass of scratch post 712 and/or assembly 700 may be between a center line 1204 of scratch post 712 and the proximal end 716, where a "center line 1204" is defined as a line contained in a transverse cross-sectional plane equidistant from distal end 720 and proximal end 716. This may be accomplished, without limitation, by constructing structural support to have a tapering density from proximal end 716 to distal end 720, and/or to have an overall density less than that of mounting plate 704 and/or proximal end plate 1100, by construction from less dense material and/or inclusion of hollows and/or voids within support structure 1200. For instance, and without limitation, mounting plate 704 and/or proximal end plate 1100 may be constructed using a first material having a first density, such as steel or other metal, and support structure 1200 may constructed using a second material having a second density less than the first density, such as without limitation plastic and/or wood.

Continuing to refer to FIG. 12, fibrous covering 724 may coat support structure 1200, for instance and without limitation by covering all or substantially all of an exterior surface of support structure 1200. Fibrous coating may include, without limitation, any flexible material or combination of materials, including without limitation sheets of polymer material fibrous elements inserted and/or formed therein such as rubber, sheets of textile material such as canvas, rope and/or twine windings, and/or any combinations thereof in layers and/or other mixtures. For instance, and without limitation, fibrous covering 724 may be constructed of materials including textiles such as without limitation cotton, canvas, acetate, acrylic, cashmere, linen, Lyra, metallic, modal, mohair, nylon, polyester, rayon, silk, soy, spandex, elastane, Tencel, viscose, and/or wool. Materials may include sheets of non-textile flexible material including leather, natural or artificial polymers, or the like. Where fibrous coating includes a rope winding, rope may be composed of any natural fibrous material and/or rope such as hemp, Manila hemp, jute, cotton, dogbane, linen, coir, straw, and/or sisal, and/or any artificial material such as nylon, polypropylene, polyesters, polyethylene, aramid fiber, and/or acrylic fiber.

With continued reference to FIG. 12, fibrous covering 724 may be placed upon support structure 1200 by any suitable means, including wrapping and/or winding fibrous covering 724 onto support structure 1200, adhering fibrous covering 724 to support structure 1200 using an adhesive such as without limitation epoxy and/or glue, stitching fibrous covering 724 to itself and/or to support structure 1200, stapling, or the like. Persons skilled in the art having the benefit of this disclosure will be aware of various ways in which fibrous covering 724 may be attached to support structure 1200.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

The invention claimed is:

1. A wall-mounted scratching structure assembly for cats, the assembly comprising:
   a mounting frame affixed to a vertical surface, the mounting frame comprising:
   a wall-facing surface mounted against the vertical surface;
   a structure-facing surface facing away from the vertical surface;
   a retention mechanism, wherein the retention mechanism comprises:
   a depression of the mounting frame having an aperture;
   an insert having a hole, wherein the insert is disposed at least partially within the depression; and
   a post received by the aperture of the depression and the hole of the insert to affix the mounting frame to the scratching structure;
   wherein the insert comprises a shape complementary to the depression that prevents rotation of the mounting frame relative to scratching structure;
   a scratching structure, wherein the scratching structure comprises:
   a proximal end abutting the mounting frame and facing the vertical surface; and
   a distal end opposite the proximal end; and
   an attachment mechanism, wherein the attachment mechanism comprises:
   a slot disposed in the mounting frame;
   a bore disposed in the scratching structure and opposite at least a portion of the slot; and
   a threaded screw traversing through the bore and the slot and disposed within the wall to affix the assembly to the vertical surface.

2. The assembly of claim 1, wherein the shape of the insert is cruciform.

3. The assembly of claim 1, wherein:
the depression includes a first depression and a second depression; and
each of the first depression and the second depression is formed to receive at least a portion of the insert.

4. The assembly of claim 3, wherein the shape of the insert comprises a double-bar cross.

5. The assembly of claim 4, wherein two or more assemblies may be connected using the retention mechanism so that a second end of a first assembly may abut a first end of a second assembly and each depression of the first assembly and the second assembly may receive a portion of the insert.

6. The assembly of claim 1, wherein the post is a threaded post.

7. The assembly of claim 1, wherein the depression includes one or more abutment surfaces along a defining edge of the depression that at least partially contacts one or more complementary abutment surfaces of the insert to prevent the insert from rotating within the depression when the insert is disposed within the depression.

8. The assembly of claim 1, wherein the mounting frame comprises a curved mounting frame.

9. The assembly of claim 1, wherein the mounting frame is composed at least in part of metal.

10. The assembly of claim 1, wherein the scratching structure comprises a fibrous coating.

11. The assembly of claim 10, wherein the bore comprises a reciprocally threaded bore.

12. The assembly of claim 1, wherein the scratching structure is hollow.

13. The assembly of claim 1, wherein the scratching structure comprises a semi-collapsed toroidal shape.

14. The assembly of claim 1, wherein the scratching structure further comprises a removable portion configured to be slidably attached to a surrounding portion of scratching structure.

15. The assembly of claim 1, wherein the insert is composed of a metal alloy.

16. The assembly of claim 1, wherein the scratching structure is composed at least in part of cardboard.

17. The assembly of claim 1, wherein the slot comprises a plurality of slots.

18. The assembly of claim 1, wherein:
the threaded screw comprises a plurality of threaded screws; and
the bore comprises a plurality of bores;
wherein each threaded screw traverses through the slot and into a corresponding bore of the plurality of bores to affix the assembly to the vertical surface.

\* \* \* \* \*